United States Patent
Chen et al.

(10) Patent No.: US 6,915,111 B2
(45) Date of Patent: Jul. 5, 2005

(54) OVER-THE-AIR COUPLER FOR RF DEVICE TESTING

(75) Inventors: Zhong Chen, Fort Collins, CO (US); Mark Wright-Johnson, Newman Lake, WA (US)

(73) Assignee: Agilent Technologies, Inc., Palo Alto, CA (US)

( * ) Notice: Subject to any disclaimer, the term of this patent is extended or adjusted under 35 U.S.C. 154(b) by 883 days.

(21) Appl. No.: 09/760,622

(22) Filed: Jan. 16, 2001

(65) Prior Publication Data

US 2002/0127971 A1 Sep. 12, 2002

(51) Int. Cl.⁷ .............................................. H04B 17/00
(52) U.S. Cl. .................. 455/67.11; 455/425; 455/67.7; 455/575.7; 343/850
(58) Field of Search ........................... 455/575.1–575.9, 455/63.1–63.7, 115.1–115.4, 271–274, 278.1, 283, 287, 288, 292, 301, 423–425, 67.11–67.7; 453/276.1, 283, 284, 289; 343/850, 851

(56) References Cited

U.S. PATENT DOCUMENTS

| | | | | |
|---|---|---|---|---|
| 5,357,262 A | * | 10/1994 | Blaese | 343/906 |
| 5,577,269 A | * | 11/1996 | Ludewig | 455/575.7 |
| 5,694,137 A | * | 12/1997 | Wood | 343/702 |
| 5,854,970 A | * | 12/1998 | Kivela | 455/575.7 |
| 5,999,889 A | | 12/1999 | Tietsworth | |
| 6,314,277 B1 | * | 11/2001 | Hsu et al. | 455/117 |

FOREIGN PATENT DOCUMENTS

EP    0 764 997    7/2000

* cited by examiner

Primary Examiner—Charles Craver (57) ABSTRACT

A preferred method for coupling an RF signal between an RF device and test equipment includes the steps of: (1) providing an RF device; (2) at least partially surrounding a first portion of the antenna of the RF device with a tuning material; and (3) coupling an RF signal to a second portion of the antenna, the second portion of the antenna being disposed between the first portion and the RF device body. Systems and devices also are provided.

30 Claims, 9 Drawing Sheets

OVER-THE-AIR COUPLER FOR RF DEVICE TESTING

BACKGROUND OF THE INVENTION

1. Field of the Invention

The present invention generally relates to RF devices and, more specifically, to systems and methods for testing RF devices, such as mobile phones, among others.

2. Description of the Related Art

The proliferation of RF devices and, in particular, wireless hand-held RF devices, such as mobile phones, hand-held Internet appliances, etc., has prompted the need for manufacturers to be able to reliably test these devices. Currently, production testing and calibration of mobile phones, for example, oftentimes is conducted with the use of RF connectors, commonly referred to as "galvanic connectors," which are formed as part of the phones. Many such galvanic connectors act as mechanical switches which temporarily disconnect the antenna of a phone when testing equipment is coupled to the phone via the galvanic connector. As the galvanic connectors typically only are utilized for manufacturing testing purposes, such galvanic connectors add to the production cost of the phones while providing little to no other benefits to the end users of the phones.

Additionally, galvanic connectors may fail to electrically reconnect the phone antenna to the phone after testing is completed, i.e., when the aforementioned testing equipment has been disengaged from the galvanic connector. Thus, it is possible that a particular phone may pass a manufacturer's testing and calibration procedures and yet fail to function properly for the end user, as the antenna may remain disconnected from the phone after completion of testing.

Therefore, there is a need for improved testing systems and methods which address these and other shortcomings of the prior art.

SUMMARY OF THE INVENTION

Briefly described, the present invention relates to radio frequency (RF) devices and, in particular, to testing of RF devices, such as mobile phones, among others. In this regard, a preferred embodiment of the present invention may be construed as providing a system for testing an RF device. Typically, the RF device includes a body and an antenna, with the antenna being configured to propagate an RF signal.

The preferred system incorporates a coupler which is configured to facilitate coupling between an RF signal and the RF device. The coupler includes a conducting member with a base wall that is configured to engage a portion of the body of the RF device, and an antenna-receiving member that is configured to receive at least a portion of the antenna. Additionally, a tuning member is provided that is configured to receive at least a portion of the antenna therein. Preferably, the tuning member is aligned with the antenna-receiving member so that at least a first portion of the antenna is receivable by the antenna-receiving member and at least a second portion of the antenna is receivable by the tuning member. So configured, resonance in a coupling coefficient of an RF signal injected into the coupler via the antenna-receiving member and the conducting member may be tuned by the tuning member.

Other embodiments of the present invention may be construed as providing methods for coupling an RF signal between an RF device and test equipment. In this regard, a preferred such method includes the steps of: (1) providing an RF device; (2) at least partially surrounding a first portion of the antenna of the RF device with a tuning material; and (3) coupling an RF signal to a second portion of the antenna, the second portion of the antenna being disposed between the first portion and the RF device body.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF A PREFERRED EMBODIMENT

Figure 1:
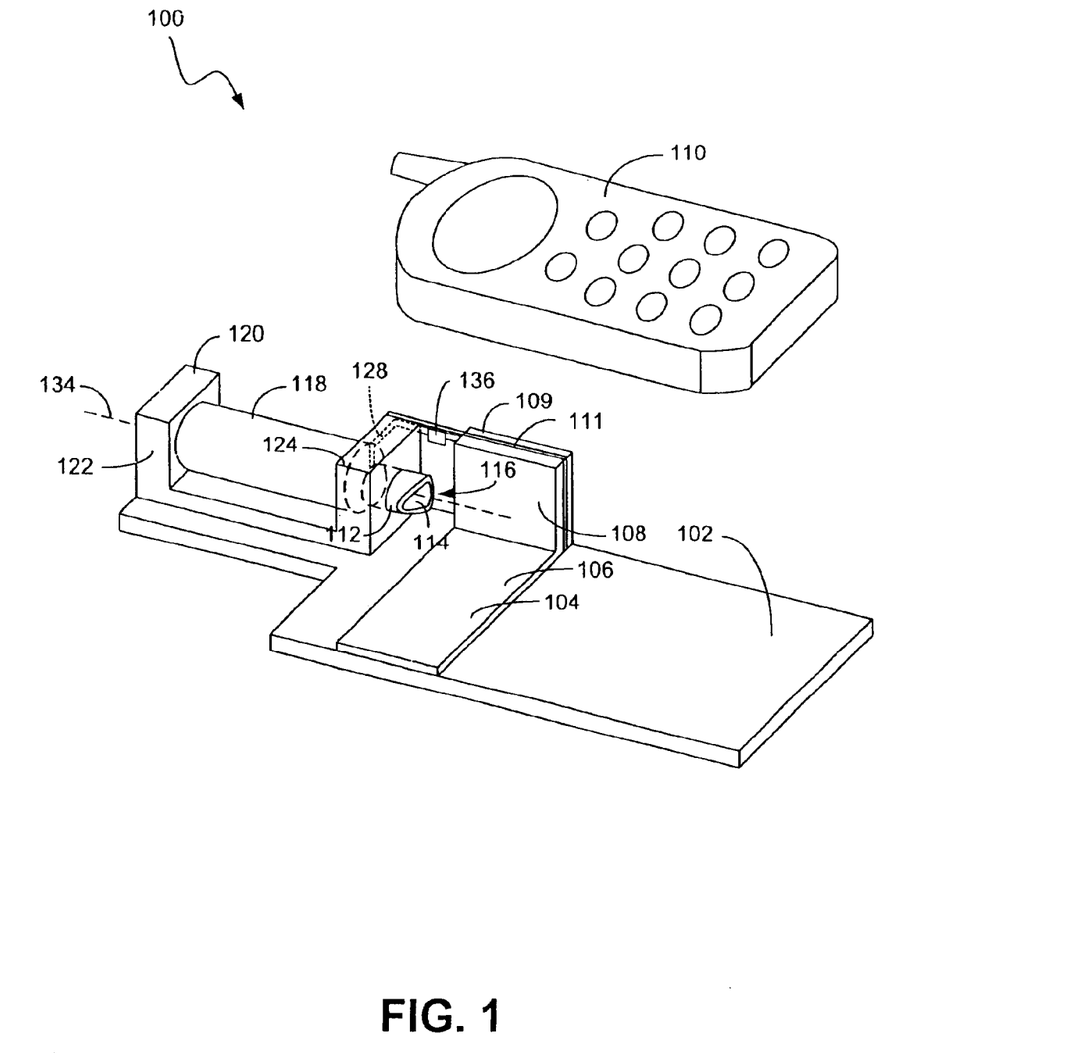
FIG. 1 is a perspective view of a preferred embodiment of the present invention shown with a representative hand-held RF device, e.g., a mobile phone.
Figure 2:
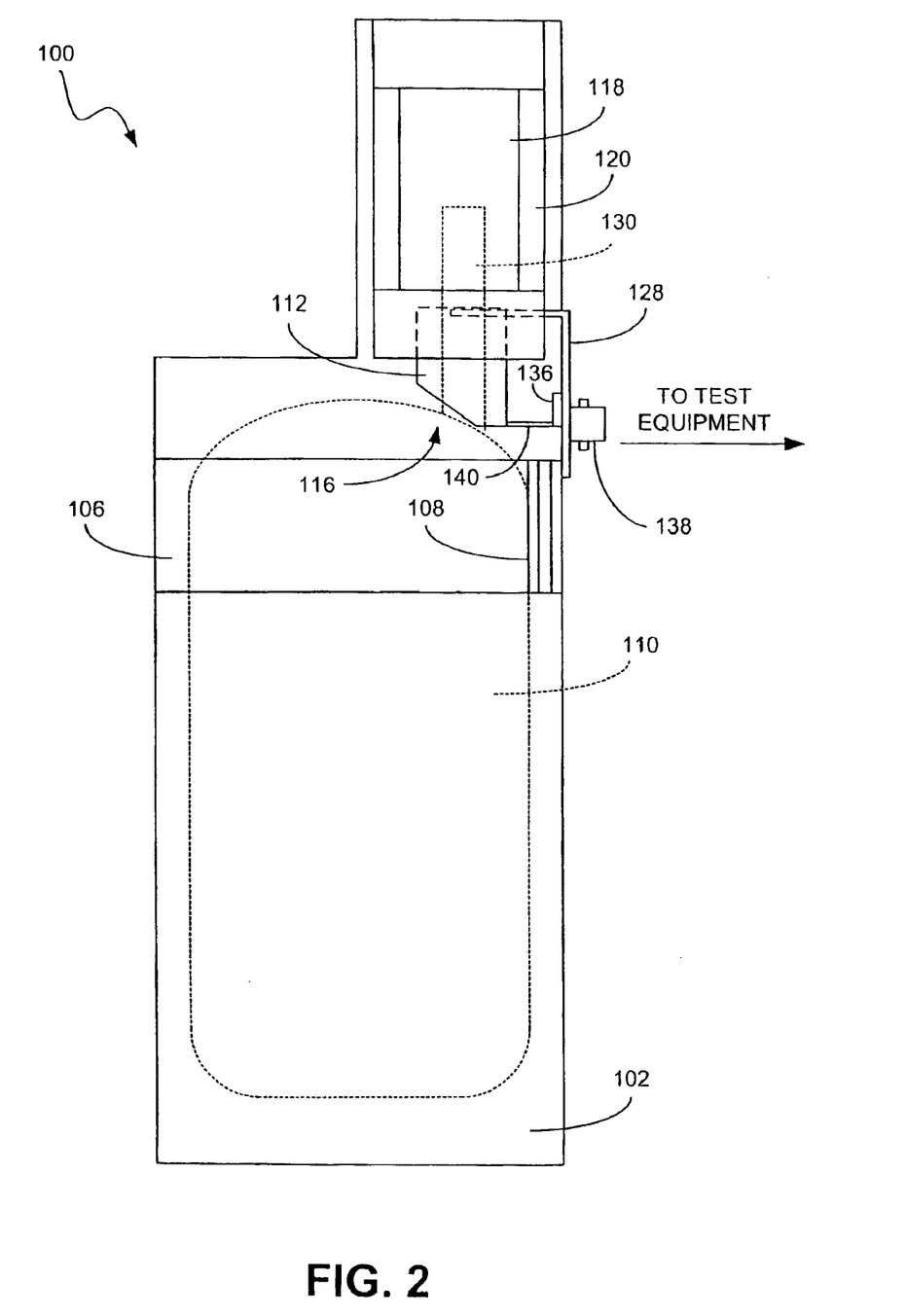
FIG. 2 is a plan view of the embodiment depicted in FIG. 1 with a representative mobile phone engaged thereon (the phone is depicted in phantom lines).

Reference is now made to FIG. 1, wherein like reference numerals indicate corresponding parts throughout the several views. As shown in FIG. 1, a preferred embodiment of the RF over-the-air coupler 100 (oftentimes referred to herein as merely "coupler") includes a base 102, which preferably is formed of a non-conductive plastic, such as Delrin®, for example, that has a dielectric constant of less than approximately 4. Upon base 102 is arranged a ground conducting member or plate 104 which, in the embodiment depicted in FIG. 1, is configured as an L-shaped member. Preferably, conducting plate 104 is formed of aluminum or another appropriately conducting material(s). The conducting plate preferably incorporates a base wall 106, which is adapted to engage base 102, and a side wall 108, which extends outwardly from the base. In other embodiments, various other configurations, such as those incorporating two side walls, no side walls, or two side walls and a "ceiling," for example, may be utilized. Spacing plate 109, which is made of aluminum or another suitable conducting material(s) may be used in some embodiments to appropriately locate an RF connector (described hereinafter). As depicted in FIG. 1, side wall 108 and spacing plate 109 cooperate so as to support a printed circuit board (PCB) 111. So configured, a hand-held RF device, such as mobile phone 110, may be arranged upon the base so that the back or underside of the phone engages or is in close proximity to base wall 106 and a side edge of the phone engages or is in close proximity to side wall 108. Such an arrangement is depicted in FIG. 2, with the representative hand-held device being depicted in phantom lines.

Coupler 100 also includes an antenna-receiving member 112 which is adapted to receive an antenna of a hand-held RF device. As is known, such an antenna may incorporate a helical structure, which may be provided in order to reduce size of the antenna. An antenna of this configuration is commonly referred to as "inductively loaded stub" or "inductive helix." Preferably, antenna-receiving member is formed of brass, or another suitable conducting material(s). As utilized herein, the term "suitable conducting material(s)" refers to a material(s) that appropriately propagates RF energy, such as a material that has a resistance of less than approximately 100 μohms-cm²/cm, for example. Antenna-receiving member preferably is formed in a generally ring-shaped configuration although various other shapes, which are considered well within the scope of the present invention, may be utilized. So configured, an antenna may be appropriately received by at least a portion of the antenna-receiving member, such as by inserting the antenna therein.

In the embodiment depicted in FIG. 1, proximal end 116 of the antenna-receiving member incorporates a contoured profile which is adapted to facilitate engagement of the antenna within an antenna-receiving orifice 114. More specifically, the contoured periphery of the proximal end of the antenna-receiving member, which may be adapted to engage the exterior surface of a phone body, for example, preferably permits a deeper engagement of the antenna within the orifice. This configuration tends to promote a tight RF coupling of the phone with the coupler. Additionally, engagement of a side of the phone with the side wall 108 also may tend to properly align the antenna for insertion into the antenna-receiving orifice.

Antenna-receiving orifice 114 communicates, e.g., is in alignment, with the interior cavity of an RF tuning member 118 which is formed of ferrite or another suitable tuning material(s). As utilized herein, the term "tuning material(s)" refers to a material(s) that is capable of altering propagation characteristics of an RF signal and/or absorbing RF energy. Preferably, tuning member 118 is configured as a hollow cylinder although various other shapes may be utilized so that an antenna may be appropriately received by at least a portion of the tuning member. Such other shapes are considered well within the scope of the present invention. Use of the tuning member tends to minimize the radiation of uncoupled energy during utilization of the coupler and, therefore, tends to provide a coupler that is relatively insensitive to minor variances in phone placement, thereby producing a more repeatable coupling. This feature also tends to promote repeatable measurements, such as during manufacturer testing and/or calibration of RF devices (described hereinafter).

Orientation of tuning member 118 and antenna-receiving member 112 is maintained by a support member 120. Various configurations of support members may be utilized provided that the configuration enables appropriate positioning of the tuning member relative to the antenna-receiving member, e.g., in some embodiments, the tuning member does not physically contact the antenna-receiving member.

In a preferred embodiment, the support member 120 includes a base portion 122 10 with opposing first and second ends 124 and 126, respectively. Base portion 122 is adapted to engage base 102 and the first and second ends are configured to extend outwardly from the base 102. So configured, tuning member 118 may be supported by the extending first and second ends of the support member 120. Additionally, first end 124 is configured to receive and support antenna-receiving member 112 so that the interior cavity of tuning member 118 and the antenna-receiving orifice 114 are appropriately aligned for receiving an antenna. Preferably support member 120 is formed of a low dielectric material(s), such as a plastic produced by cross-linking polystyrene with divinylbenzene, e.g., Rexolite® manufactured by C-LEC plastics, Inc., among others. As utilized herein, the term "low dielectric material(s)" refers to a material(s) that has a dielectric constant of less than approximately 3.

Electrical connectivity between the antenna-receiving member 112 and conducting plate 104 preferably is facilitated by a conducting trace 128. As depicted in FIG. 1, conducting trace 128 extends outwardly from antenna-receiving member 112 and away from base member 102, then extends transverse to a longitudinal axis 134 of the antenna-receiving member, and then extends parallel to the longitudinal axis of the antenna-receiving member along PCB 111. In other embodiments, other arrangements of the conducting trace may be utilized. Additionally, a load resistor 136 electrically communicates with the conducting trace and, as described in greater detail hereinafter, may be selected to reduce the voltage standing wave ratio (VSWR) at the coupler input, while increasing the coupling coefficient. In other embodiments, the load resistor may provide variable resistance that can be changed manually or electrically.

Electrical interconnection of the antenna-receiving member and test equipment (not shown) preferably is facilitated by a suitable RF connector or coupler input, such as an SMA coaxial connector, among others. A representative RF connector 138 is shown in FIG. 2. So provided, the center pin 140 of the RF connector may be electrically connected to the antenna-receiving member 112. This may be accomplished by soldering, press-fit, conductive adhesives, etc. The RF connector is mounted so that the outer shield of the connector may electrically communicate with the conducting plate 104.

As depicted in FIG. 2, a hand-held wireless RF device, such as mobile phone 110, preferably engages the coupler 100 as the antenna 130 is inserted within the antenna-receiving member 112 and at least a portion of tuning member 118 (an alternative embodiment of a coupler of the present invention, and its associated engagement methodology with an RF device, will be described hereinafter). So provided, coupler 100 enables RF coupling, e.g., backward coupling, of the antenna 130 to the coupler 100. As utilized herein, the term "backward coupling" refers to the coupling direction being in the opposite direction of the input signal (described in detail hereinafter).

Operation

Operation of the coupler now will be described in greater detail. As shown in FIGS. 1 and 2, a preferred embodiment of the coupler 100 of the present invention is adapted to engage an RF device, such as mobile phone 110, for testing. For instance, to facilitate proper engagement of the phone and the coupler, the body of the phone is arranged so that the antenna may be inserted into the antenna-receiving orifice of the antenna-receiving member. In this regard, the preferred ring-shaped configuration of the antenna-receiving member typically requires that the body of the phone engage (or be placed in close proximity to) the conducting plate 104, e.g., the back or underside of the phone engages base wall 106 and a side edge of the phone preferably engages side wall 108, thereby aligning the antenna with the orifice. Thereafter, the phone may be moved in a direction substantially parallel to longitudinal axis 134 of the antenna-receiving member, thereby allowing the antenna to appropriately seat within the orifice. Once so positioned, the phone is ready for testing and/or calibration. As desired, the coupler and its associated RF device may be arranged within a shielded metallic enclosure for protecting measurements from a noisy surrounding environment.

Testing and calibration of an RF device, particularly in a manufacturing environment, typically includes tuning of the receiver(s) and/or transmitter(s) of the device. In this regard, the coupler of the present invention may be electrically interconnected with test equipment (described hereinbefore) and signals may be injected and/or extracted from the RF device. For instance, during receiver tuning, a known signal may be provided to the coupler from the test equipment. Given a known coupling loss for the coupler and RF device configuration, the receiver may then be tuned or calibrated to a desired setting. In contrast, during transmitter tuning, a known coupling loss for the coupler and RF device configuration is applied to a signal received from the RF device via the coupler and test equipment. Based upon the received signal, the transmitter may then be tuned or calibrated to a desired setting.

As is known, various methods may be utilized for determining coupling loss of a particular coupler and RF device configuration. For instance, a "hacked" RF device may be utilized which typically comprises a body of the device, including the device antenna, with the receiver of the device being bypassed to signal detection equipment. So configured, a signal may be provided from the test equipment to the coupler, with the coupled signal then being provided from the device antenna to the signal detection equipment for analysis. Thus, by analyzing the signal received by the signal detection equipment, a value for coupling loss may be established.

Theory of Operation

Figure 3:
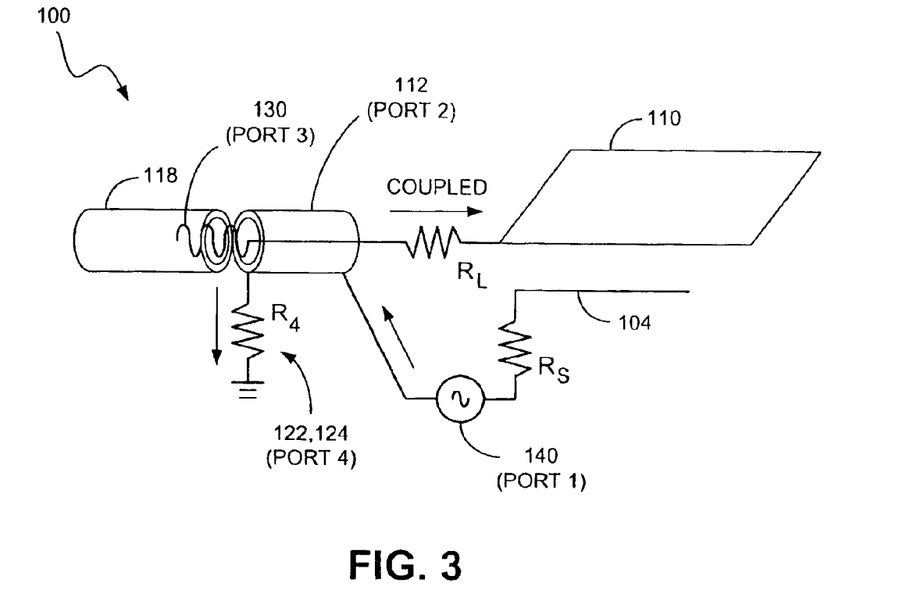
FIG. 3 is a schematic diagram of the embodiment of the present invention depicted in FIGS. 1 and 2.

Theory of operation of the coupler now will be described in greater detail. Depicted schematically in FIG. 3, antenna 130 of phone 110 has been inserted within antenna-receiving member 112 and tuning member 118 as described hereinbefore. Note that conducting plate 104 and antenna-receiving member 112 are configured as arms of an antenna. More specifically, electrical paths are provided between signal generator 140 and conducting plate 104, and the signal generator and the antenna-receiving member. As depicted in FIG. 3, resistor $R_S$ and signal generator 140 are intended to denote test equipment, which is utilized for injecting a signal into and/or extracting a signal from the coupler 100. Conductive trace 128 and load resistor 136 are represented schematically by resistor $R_4$, which electrically communicates with the antenna-receiving member. Additionally, $R_L$ denotes the resistive load of the phone.

As shown in FIG. 3, the coupler 100 and the phone 110 or device under test (DUT) do not share a common ground. In order to simplify analysis of the coupling, it may be reasonably assumed that the DUT is electrically connected to the conducting plate 104 via a capacitor (not shown). As is known, the size and placement of the conducting plate may be chosen so that the capacitance is large. Therefore, one may assume that the DUT and the conductive plate are at the same electrical potential. Thus, the coupler then can be represented by a four-port network, such as the network depicted in FIG. 4. It should be noted that in FIG. 4, $a_1$ is the injected signal, $b_1$ is the reflected signal, and $b_2$ is the received signal, i.e., the signal received by the test equipment. In other embodiments, it may be desirable to have the DUT in physical, electrical contact with the conducting plate 104. In such an embodiment, the capacitance would be infinite.

If all four ports are terminated with matched loads $Z_0$, the coupler can be decomposed to even and odd modes. The interaction between the two modes induces the coupling between the two transmission lines. The linear combination of these modes will determine the coupling coefficient and matching properties of the coupler. In even-mode, both transmissions lines are at the same potential, and are both driven from the same source against the ground. In odd-mode, the two lines are driven out of phase against each other, but with equal magnitude. The even and odd modes have different characteristic impedances, denoted as $Z_{0e}$ and $Z_{0o}$ respectively. It can be shown (Najesh Mongia, Inder Bahl, and Prakash Bhartia, "*RF awnd Microwave Coupled-line Circuits*", Artech House, 1999):

$$\alpha = S_{21} = \frac{b_2}{a_1} = \frac{jk\sin\theta}{\sqrt{1-k^2}\cos\theta + j\sin\theta}, \quad (1)$$

$$\beta = S_{41} = \frac{b_4}{a_1} = \frac{\sqrt{1-k^2}}{\sqrt{1-k^2}\cos\theta + j\sin\theta}$$

where $$k = \frac{Z_{0e} - Z_{0o}}{Z_{0e} + Z_{0o}}, \quad (2)$$

and $\theta$ is the electrical length of the coupled section (if the coupled section is a quarter of a wavelength long, $\theta=90°$). The network matrix for the 4-port network is:

$$\begin{bmatrix} b_1 \\ b_2 \\ b_3 \\ b_4 \end{bmatrix} = \begin{bmatrix} 0 & \alpha & 0 & \beta \\ \alpha & 0 & \beta & 0 \\ 0 & \alpha & 0 & \beta \\ \alpha & 0 & \beta & 0 \end{bmatrix} \begin{bmatrix} a_1 \\ a_2 \\ a_3 \\ a_4 \end{bmatrix}. \quad (3)$$

Figure 4:
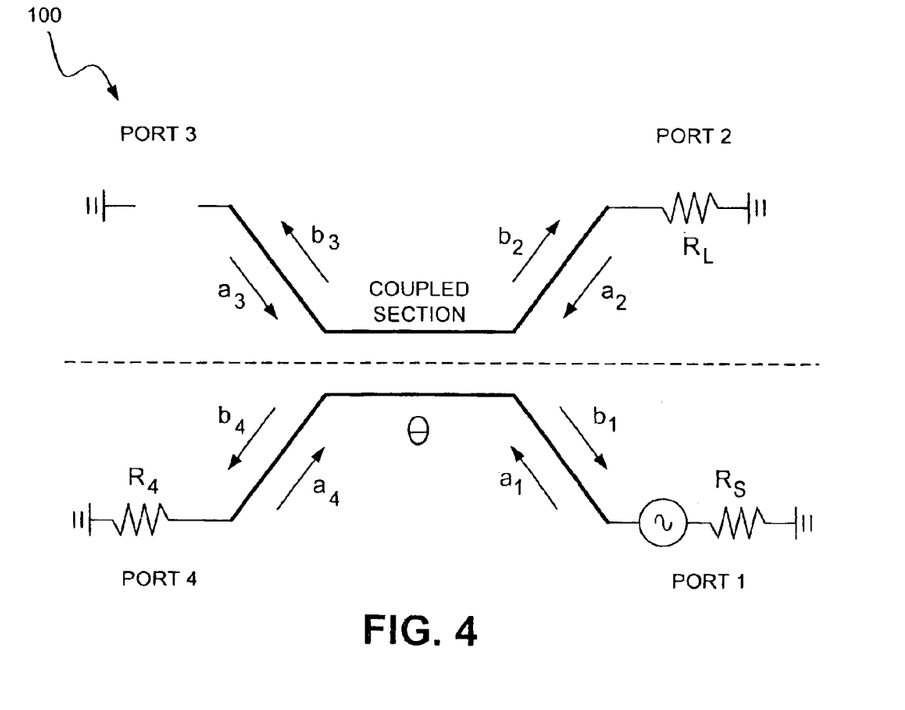
FIG. 4 is a schematic diagram depicting an equivalent four-port network corresponding to the schematic diagram of FIG. 3.

In the coupler design shown in FIG. 4, not all ports are terminated with matched loads. If ports 1 and 2 are matched, and ports 3 and 4 have reflection coefficient of $\rho_3$ and $\rho_4$ respectively, $$\begin{cases} a_2 = 0 \\ a_3 = \rho_3 b_3 \\ a_4 = \rho_4 b_4. \end{cases} \quad (4)$$

Then, from (3) and (4), $$\begin{cases} b_1 = \beta \rho_4 b_4 \\ b_2 = \alpha a_1 + \beta \rho_3 b_3 \\ b_3 = \beta \rho_4 b_4 \\ b_4 = \alpha a_1 + \beta \rho_3 b_3. \end{cases} \quad (5)$$

Solving from (5), we get:

$$\frac{b_4}{a_1} = \frac{\beta}{1 - \alpha^2 \rho_3 \rho_4} \quad (6)$$

$$T = \frac{b_2}{a_1} = \alpha \frac{1 - \rho_3 \rho_4 (\alpha^2 - \beta^2)}{1 - \alpha^2 \rho_3 \rho_4} \quad (7)$$

$$\rho_{in} = \frac{b_1}{a_1} = \frac{\beta^2 \rho_4}{1 - \alpha^2 \rho_3 \rho_4} \quad (8)$$

$\rho_{in}$ is the reflection coefficient see from the coupler input (port 1), and T is the transfer function, or the coupling coefficient to port 2. VSWR of port 1 is $$VSWR = \frac{1 + |\rho_{in}|}{1 - |\rho_{in}|}. \quad (9)$$

We can now look at the coupler design with some numerical examples, and how different parameters influence the VSWR and coupling coefficient. Note that k is the coupling factor when all four ports are matched. The value of k is dependent on the physical layout of the transmission lines (line thickness, separation between the two, distance to the ground plane etc . . . ).

As is evident from the following examples, the ferrite (or other tuning material) of tuning member 118 tends to de-tune a high Q resonance in the coupling coefficient which forms between the antenna of the DUT and the coupler. In many devices, e.g., cellular phones, this resonance normally occurs at approximately 850 MHz. The tuning member also provides the benefit of absorbing excess energy present on the antenna that otherwise would radiate. This tends to provide a coupler that is relatively insensitive to minor variances in phone placement, thereby producing more repeatable coupling. Thus, the RF tuning member may, in some embodiments, perform the dual functions of tuning and damping.

EXAMPLE 1

Figure 5:
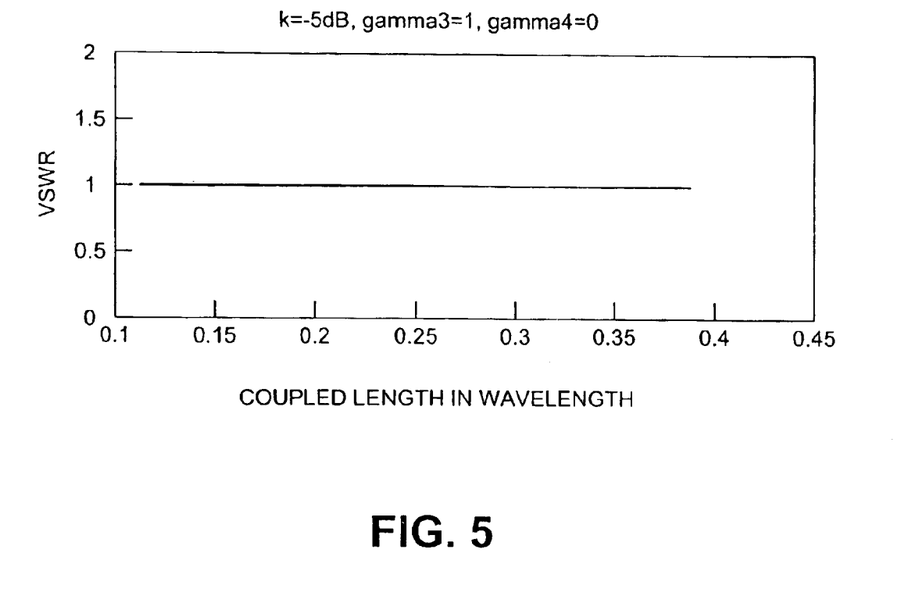
FIG. 5 is graph depicting voltage standing wave ratio (VSWR) versus coupled length in wave length for Ports 1 and 2 of the network depicted in FIG. 4.
Figure 6:
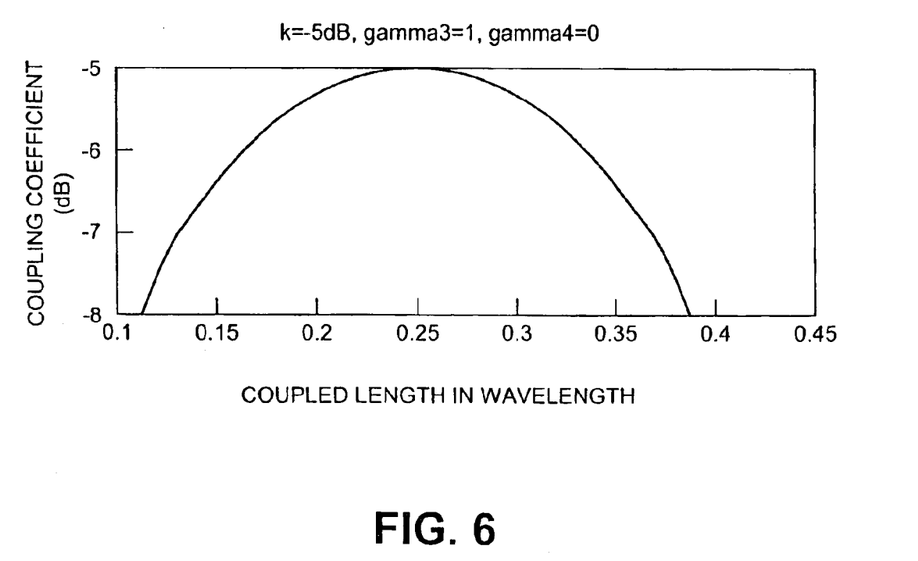
FIG. 6 is graph depicting coupling coefficient versus coupled length in wave length for Ports 1 and 2 of the network depicted in FIG. 4.

The setup is shown in FIG. 4 assuming k=−5 dB. Port 3 is open, and Port 4 is matched ($\rho_3$=1, and $\rho_4$=0). The VSWR at Port 1 and the coupling coefficients between Ports 1 and 2 are shown in FIGS. 5 and 6.

EXAMPLE 2

Figure 7:
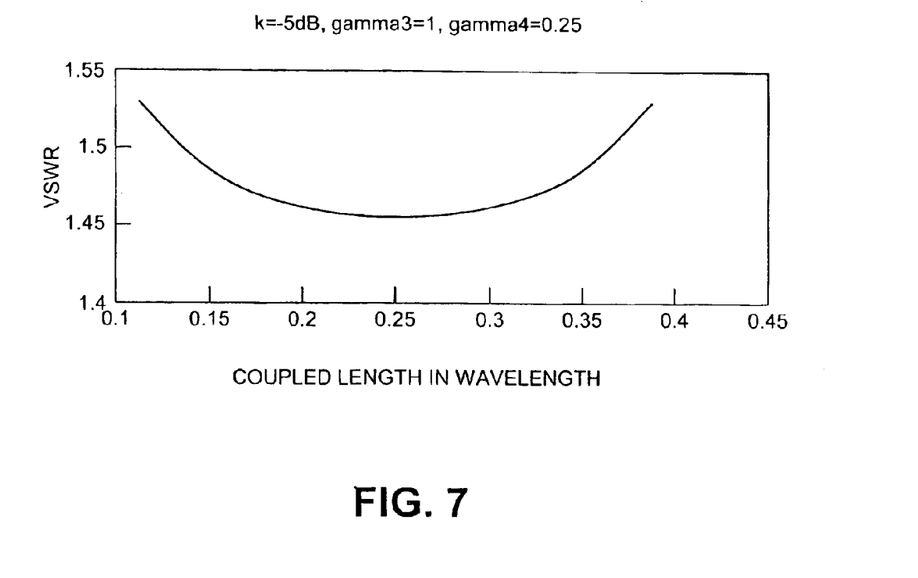
FIG. 7 is graph depicting VSWR versus coupled length in wave length for Ports 1 and 2 of the network depicted in FIG. 4.
Figure 8:
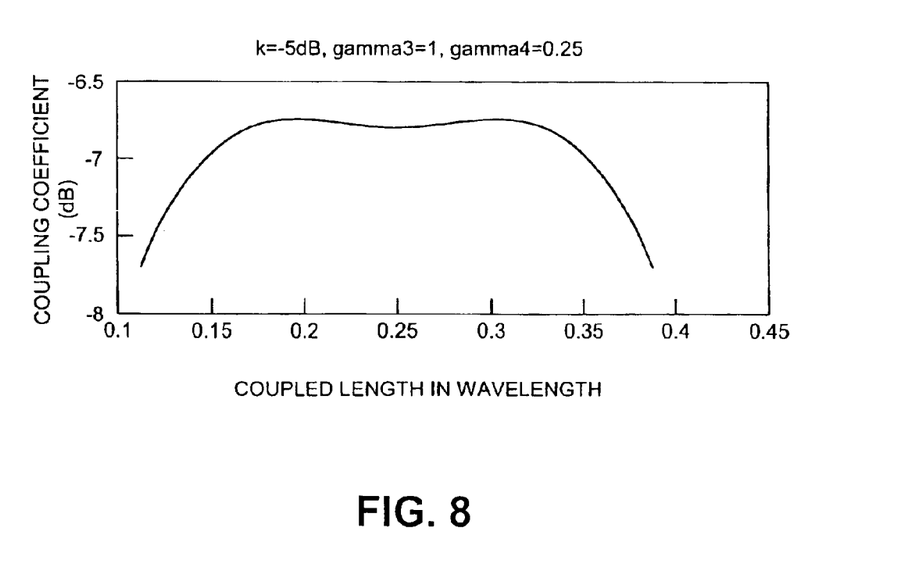
FIG. 8 is graph depicting coupling coefficient versus coupled length in wave length for Ports 1 and 2 of the network depicted in FIG. 4.
Figure 9:
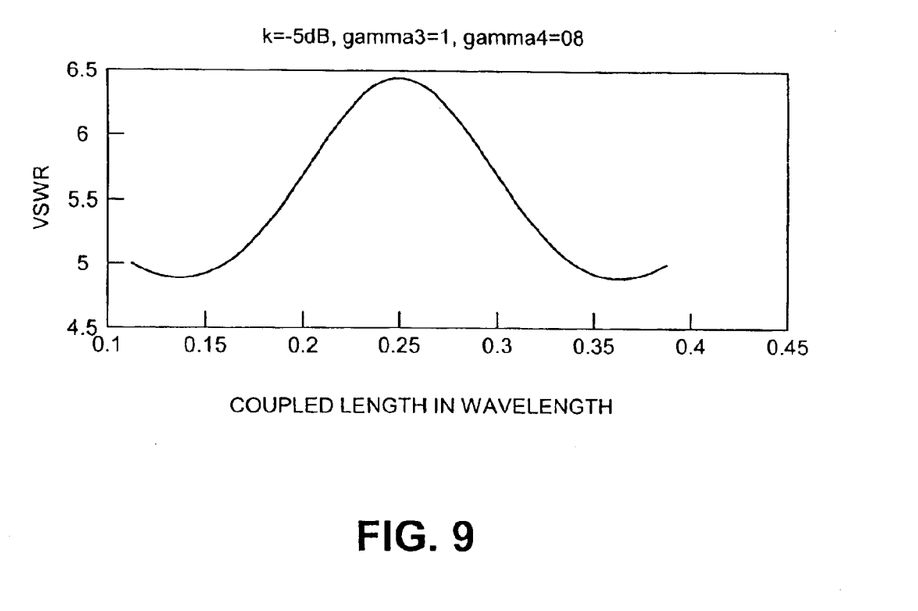
FIG. 9 is graph depicting VSWR versus coupled length in wave length for Ports 1 and 2 of the network depicted in FIG. 4.

The setup is shown in FIG. 9 assuming k=−5 dB. Port 1 is 50Ω, Port 3 is open, and Port 4 is terminated with a 83.33 ohm resistor ($\rho_3$=1, and $\rho_4$=0.25). The VSWR at Port 1 and the coupling coefficients between Ports 1 and 2 are shown in FIGS. 7 and 8.

EXAMPLE 3

Figure 10:
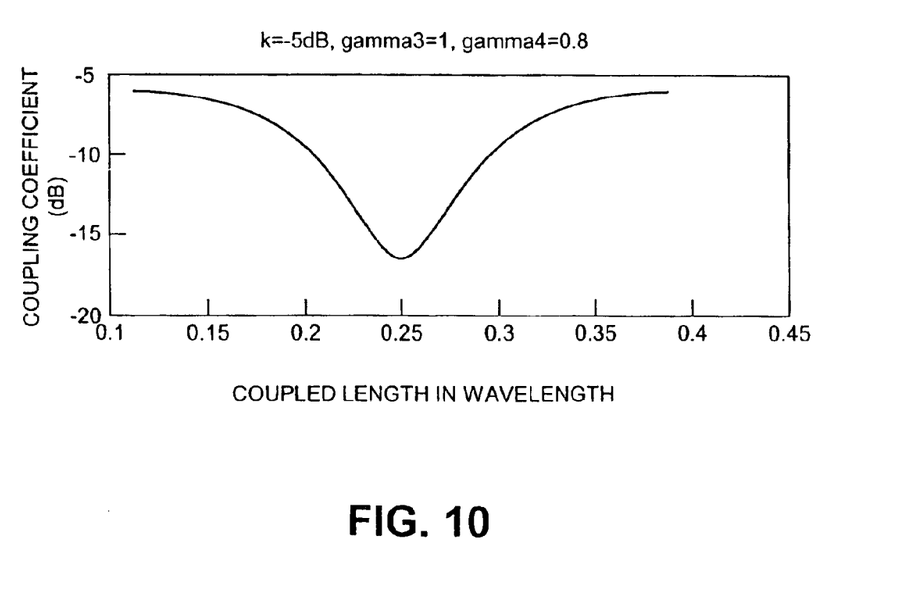
FIG. 10 is graph depicting coupling coefficient versus coupled length in wave length for Ports 1 and 2 of the network depicted in FIG. 4.

The setup is shown in FIG. 9 assuming k=−5 dB. Port 1 is 50Ω, Port 3 is open, and Port 4 is terminated with a 450 ohm resistor ($\rho_3$=1, and $\rho_4$=0.8). The VSWR at Port 1 and the coupling coefficients between Ports 1 and 2 are shown in FIGS. 9 and 10.

Figure 11:
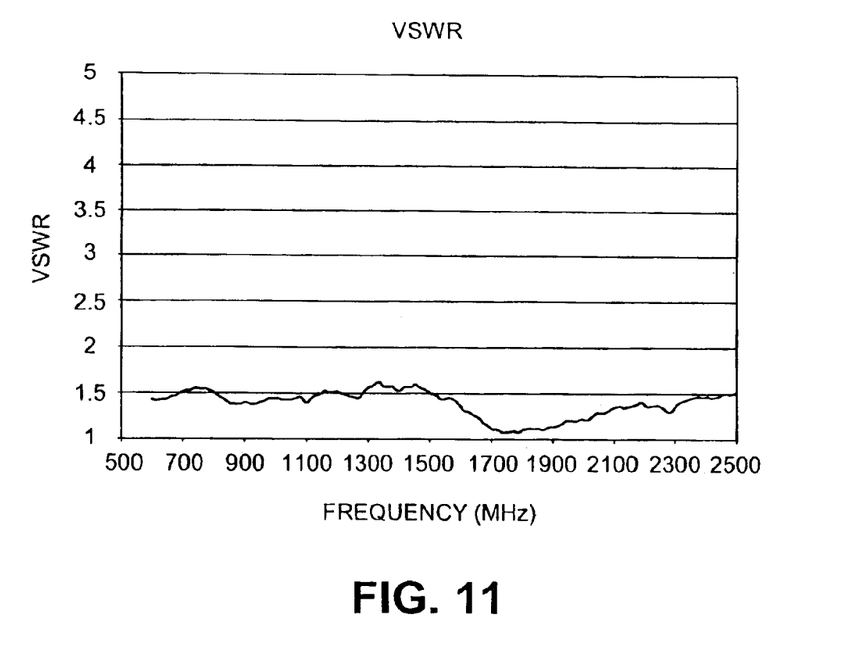
FIG. 11 is a graph depicting VSWR (as seen from the coupler input port) versus frequency for the embodiment of the present invention depicted in FIG. 1.
Figure 12:
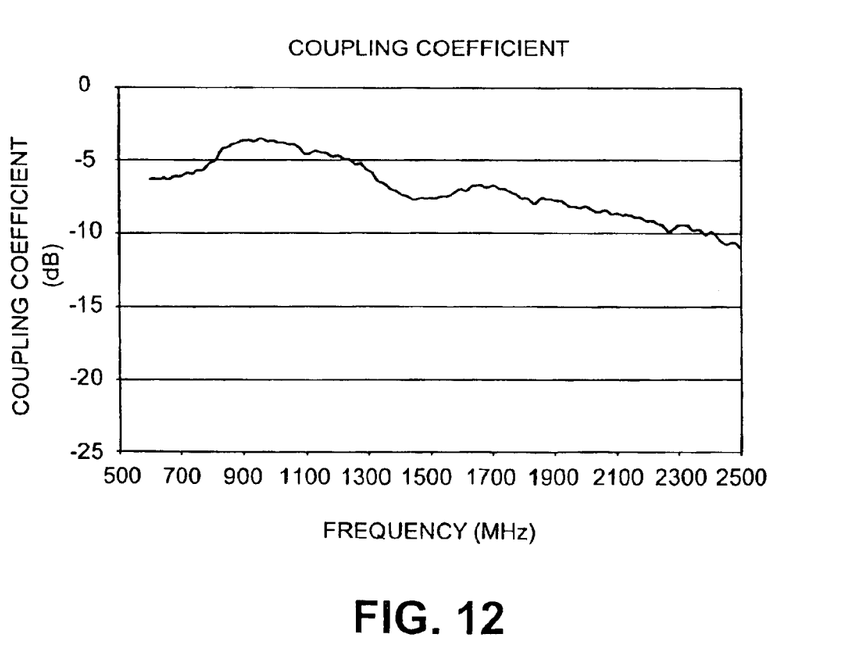
FIG. 12 is a graph depicting coupling coefficient (between the coupler input and mobile phone antenna port) versus frequency for the embodiment of the present invention depicted in FIG. 1.

Additionally, FIGS. 11 and 12 show measured performance of an actual coupler produced in accordance the representative embodiment depicted in FIG. 1. Measurements were taken utilizing a vector network analyzer (Agilent 8753ES manufactured by Agilent Technologies).

Figure 13:
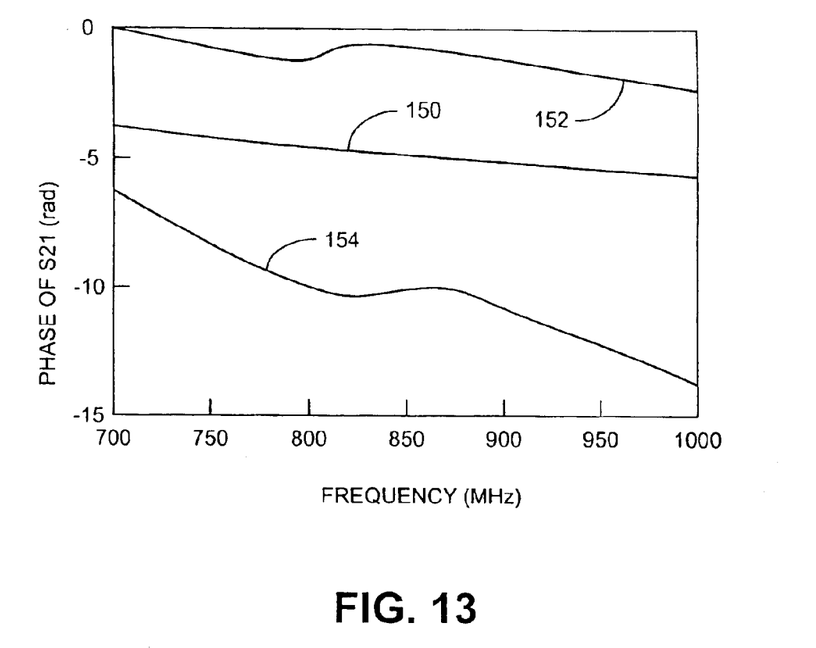
FIG. 13 is a graph depicting phase versus frequency (measured phase response of the embodiment of the present invention depicted in FIG. 1).

FIG. 13 shows measured frequency response of three couplers: trace 150 corresponds to the actual coupler produced in accordance the representative embodiment depicted in FIG. 1; trace 152 corresponds to an Agilent Triaxial, manufactured by Agilent Technologies; and trace 154 corresponds to an E6392-60002 coupler, manufactured by Agilent Technologies. As shown therein, a high Q resonance in the coupling coefficient is not evident in trace 150, e.g., the resonance has been de-tuned and/or damped as compared to the other traces. Therefore, the present invention tends to provide a coupler that is relatively insensitive to misplacement, e.g., misalignment of the antenna and the coupler. As is known, such sensitivity may shift the frequency of a coupling.

Figure 14:
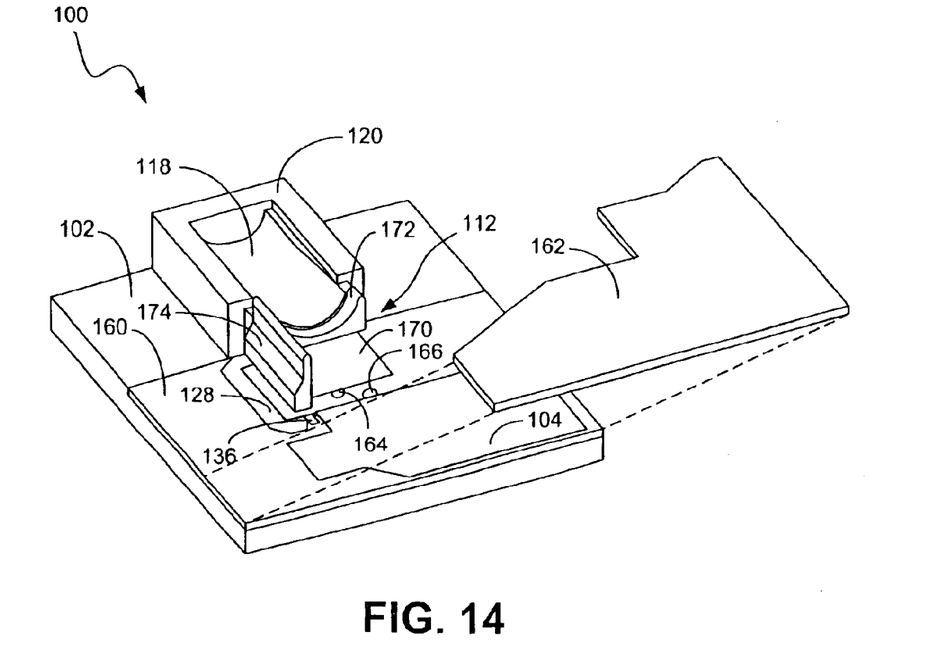
FIG. 14 is a perspective view of an alternative embodiment of the present invention.
Figure 15:
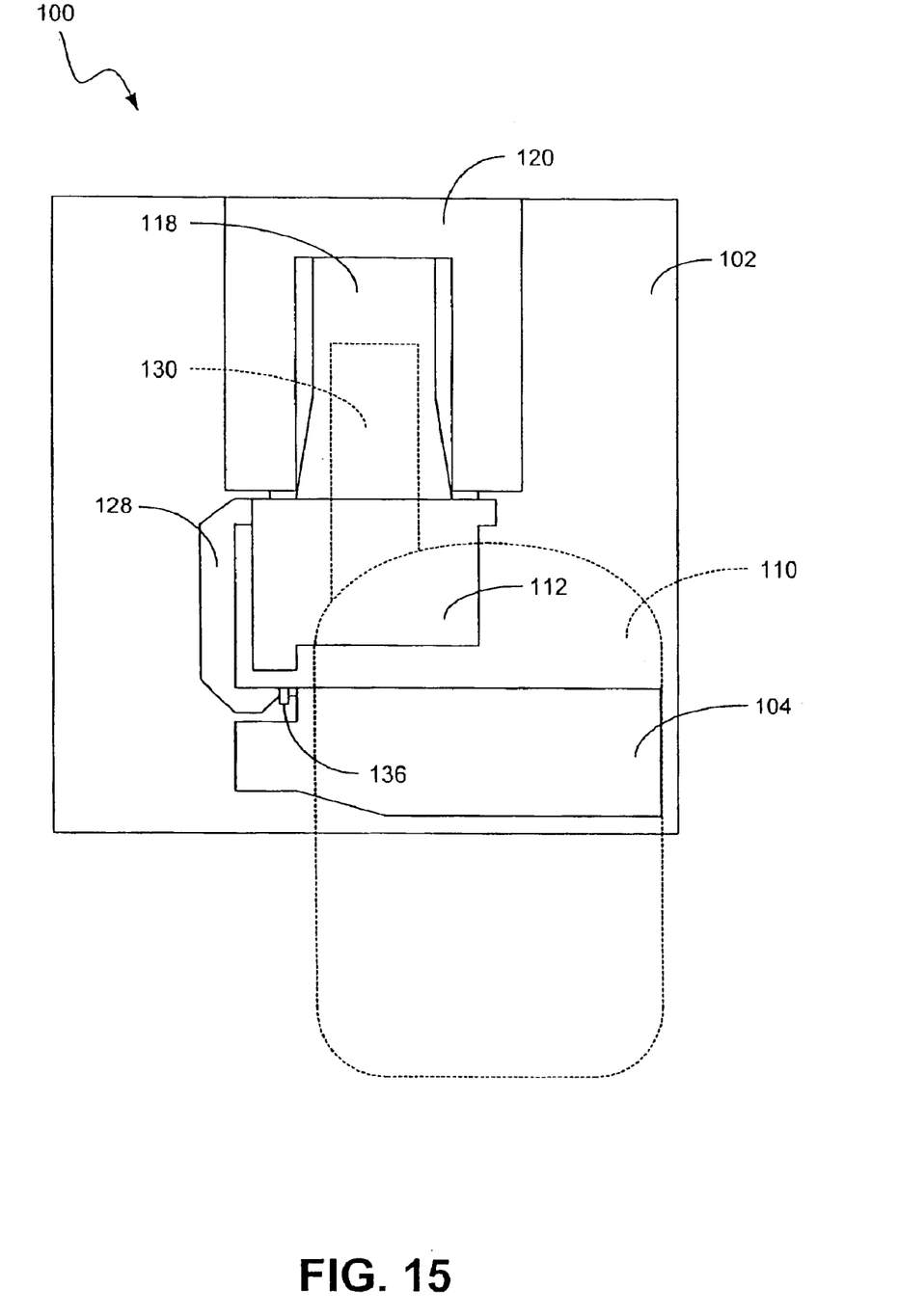
FIG. 15 is a schematic view of the embodiment depicted in FIG. 14 shown with a representative hand-held RF device.

Reference will now be made to FIG. 14 which depicts a representative alternative embodiment of the coupler 100 of the present invention. As shown in FIG. 14, the coupler 100 of the present invention may incorporate an open structure. More specifically, the embodiment depicted in FIG. 14 includes an antenna-receiving member 112 and a tuning member 118 that are configured to receive an antenna without having to insert such an antenna into those members via an orifice or cavity. In this regard, such as depicted in FIG. 15, an RF device, such as a mobile phone, for example, may engage the coupler by appropriately aligning the device and then placing at least a portion of the antenna 130 in close proximity to the tuning member as well as the antenna-receiving member 112.

Referring once again to FIG. 14, the coupler depicted therein includes a base 102 that is adapted to engage a support member 120 as well as a PCB 160. In this embodiment, PCB 160 includes the following components: planar portion 170 (part of antenna-receiving member 112), trace 128, conducting plate 104, and solder vias 164 and 166. PCB 160 may serve as a mounting platform for various components of the coupler, including side wall 174 (part of antenna-receiving member 112), load resistor 136, and, optionally, faceplate 162. In order to protect the various components of PCB 160, a faceplate or cover 162 may be utilized which is adapted to cover and protect at least some of the components, e.g., components which may be worn due to engagement with the body of an RF device. A suitable RF connector (not shown) preferably engages the underside of PCB 160 with appropriate portions of the RF connector electrically communicating with antenna-receiving member 112, such as via solder via 164, and conducting plate 104, such as with solder via 166.

In the embodiment depicted in FIG. 14, coupler 100 includes an antenna-receiving member 112 that incorporates a substantially planar portion 170, a substantially arcuate-shaped or cradle portion 172, and a side wall 174. Preferably, planar member 170 is formed as a portion of the PCB with the cradle member 172 and side wall 174 being mechanically affixed thereto in any conventional manner. Much like the side wall 108 depicted in FIG. 1, side wall 174 of the antenna-receiving member depicted in FIG. 14 is adapted to facilitate ready alignment of an RF device for appropriately positioning the antenna to be received by the cradle portion 172 and the tuning member 118. In this regard, tuning member 118 preferably is configured as a segment of a cylinder although various other shapes may be utilized provided that an antenna may be received by the tuning member preferably by downwardly directing the antenna into the concavity defined by the tuning member. So configured, the coupler 100 depicted in FIG. 14 is readily adapted to receive an RF device, such as by appropriately aligning the device above tuning member 118 and antenna receiving member 112, and then urging the device downwardly until at least a portion of the body of the device engages a portion of base 102, e.g., cover 162, as depicted schematically in FIG. 15. Once so positioned, the antenna of the device should be appropriately aligned relative to the tuning member and the antenna receiving member.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system for testing a radio frequency (RF) device, the RF device having a body and an antenna, the antenna being configured to propagate an RF signal, said system comprising:
    a coupler configured to facilitate coupling between an RF signal and an RF device, said coupler comprising:
        a conducting member having a base wall, said base wall being configured to engage a portion of the body of the RF device;
        an antenna-receiving member configured to receive at least a portion of the antenna; and
        a tuning member configured to receive at least a portion of the antenna therein, said tuning member being aligned with said antenna-receiving member such that at least a first portion of the antenna is receivable by said antenna-receiving member and at least a second portion of the antenna is receivable by said tuning member;
        wherein resonance in a coupling coefficient of an RF signal injected into said coupler via said antenna-receiving member and said conducting member is tuned by said tuning member; and
    wherein the RF signal is injected in a first direction, and a coupled signal corresponding to the injected RF signal is characterized by a second direction, the first direction being substantially opposite to the second direction.

2. A system for testing a radio frequency (RF) device, the RF device having a body and an antenna, the antenna being configured to propagate an RF signal, said system comprising:
    a coupler configured to facilitate coupling between an RF signal and an RF device, said coupler comprising:
        a conducting member having a base wall, said base wall being configured to engage a portion of the body of the RF device;
        an antenna-receiving member configured to receive at least a portion of the antenna; and
        a tuning member configured to receive at least a portion of the antenna therein, said tuning member being aligned with said antenna-receiving member such that at least a first portion of the antenna is receivable by said antenna-receiving member and at least a second portion of the antenna is receivable by said tuning member;
        wherein resonance in a coupling coefficient of an RF signal injected into said coupler via said antenna-receiving member and said conducting member is tuned by said tuning member; and
    wherein a resistive load is electrically coupled between said antenna-receiving member and said conducting member, said resistive load being configured to increase the coupling coefficient.

3. The system of claim 1, wherein said antenna-receiving defines an orifice and said tuning member defines a cavity, said orifice being configured to receive at least a portion of the antenna therethrough, said cavity being configured to receive at least a portion of the antenna therein.

4. A system for testing a radio frequency (RF) device, the RF device having a body and an antenna, the antenna being configured to propagate an RF signal, said system comprising:
    a coupler configured to facilitate coupling between an RF signal and an RF device, said coupler comprising:
        a conducting member having a base wall, said base wall being configured to engage a portion of the body of the RF device;
        an antenna-receiving member configured to receive at least a portion of the antenna; and
        a tuning member configured to receive at least a portion of the antenna therein, said tuning member being aligned with said antenna-receiving member such that at least a first portion of the antenna is receivable by said antenna-receiving member and at least a second portion of the antenna is receivable by said tuning member;
        wherein resonance in a coupling coefficient of an RF signal injected into said coupler via said antenna-receiving member and said conducting member is tuned by said tuning member; and
    wherein a resistive load is electrically coupled between said antenna-receiving member and said conducting member, said resistive load being configured to reduce a voltage standing wave ratio (VSWR) of said coupler.

5. The system of claim 1, wherein tuning of the resonance in the coupling coefficient of the RF signal is further defined as damping the resonance in the coupling coefficient of the RF signal by said tuning member.

6. The system of claim 1, further comprising:
    test equipment electrically communicating with said coupler, said test equipment being configured to determine a characteristic of the RF signal.

7. The system of claim 1, further comprising:
    means for supporting said tuning member.

8. The system of claim 1, wherein tuning member is formed of ferrite.

9. The system of claim 1, wherein antenna-receiving member is formed of brass.

10. A system for testing a radio frequency (RF) device, the RF device having a body and an antenna, the antenna being configured to propagate an RF signal, said system comprising:

a coupler configured to facilitate coupling between an RF signal and an RF device, said coupler comprising:
   a conducting member having a base wall, said base wall being configured to engage a portion of the body of the RF device;
   an antenna-receiving member configured to receive at least a portion of the antenna; and
   a tuning member configured to receive at least a portion of the antenna therein, said tuning member being aligned with said antenna-receiving member such that at least a first portion of the antenna is receivable by said antenna-receiving member and at least a second portion of the antenna is receivable by said tuning member;
wherein resonance in a coupling coefficient of an RF signal injected into said coupler via said antenna-receiving member and said conducting member is tuned by said tuning member;
wherein said conductive member has a side wall, said side wall extending outwardly from said base wall such that said base wall and said side wall form an L-shaped configuration, and wherein engagement of the RF device with said side wall tends to align the antenna with said antenna-receiving member and said tuning member.

11. The system of claim 3, wherein said antenna-receiving member has a proximal end with a contoured periphery, at least a portion of said contoured periphery being configured to engage the RF device such that the antenna of the RF device is substantially completely insertable within said antenna-receiving orifice.

12. The system of claim 3, wherein said tuning member engages a support member, said support member being configured to align said antenna-receiving orifice with said cavity of said tuning member.

13. A system for testing a radio frequency (RF) device, the RF device having a body and an antenna, the antenna being configured to propagate an RF signal, said system comprising:
   a coupler configured to facilitate coupling between an RF signal and an RF device, said coupler comprising:
      a conducting member having a base wall, said base wall being configured to engage a portion of the body of the RF device;
      an antenna-receiving member configured to receive at least a portion of the antenna; and
      a tuning member configured to receive at least a portion of the antenna therein, said tuning member being aligned with said antenna-receiving member such that at least a first portion of the antenna is receivable by said antenna-receiving member and at least a second portion of the antenna is receivable by said tuning member;
   wherein resonance in a coupling coefficient of an RF signal injected into said coupler via said antenna-receiving member and said conducting member is tuned by said tuning member; and
further comprising:
   an RF connector engaging electrically engaging said coupler, said RF connector being configured as a coaxial cable connector having a pin and an exterior shield, said pin electrically engaging said antenna-receiving member, said exterior shield electrically engaging said conducting plane.

14. The system of claim 5, wherein said damping occurs at a frequency of approximately 850 MHz.

15. A system for testing a radio frequency (RF) device, the RF device having a body and an antenna, the antenna being configured to propagate an RF signal, said system comprising:
   a coupler configured to facilitate coupling between an RF signal and an RF device, said coupler comprising:
      a conducting member having a base wall, said base wall being configured to engage a portion of the body of the RF device;
      an antenna-receiving member configured to receive at least a portion of the antenna; and
      a tuning member configured to receive at least a portion of the antenna therein, said tuning member being aligned with said antenna-receiving member such that at least a first portion of the antenna is receivable by said antenna-receiving member and at least a second portion of the antenna is receivable by said tuning member;
   wherein resonance in a coupling coefficient of an RF signal injected into said coupler via said antenna-receiving member and said conducting member is tuned by said tuning member; and
   wherein said support member engages said antenna-receiving member such that said support member maintains a spaced arrangement of said antenna-receiving member and said conducting plane.

16. A method for coupling an RF signal between an RF device and test equipment, the RF device having a body and an antenna, the antenna being configured to propagate the RF signal, said method comprising the steps of:
   providing an RF device;
   at least partially surrounding a first portion of the antenna of the RF device with a tuning material;
   coupling an RF signal to a second portion of the antenna, the second portion of the antenna being disposed between the first portion and the RF device body;
   wherein the step of coupling an RF signal to a second portion of the antenna comprises the step of:
   injecting the RF signal in a first direction such that the coupled signal corresponding to the injected RF signal is characterized by a second direction, the first direction being substantially opposite to the second direction.

17. The method of claim 16, wherein resonance in a coupling coefficient of the injected RF signal is damped by the tuning material.

18. The method of claim 16, wherein the step of injecting the RF signal comprises the step of:
   injecting the RF signal with test equipment;
   determining a characteristic of the coupled signal; and
   tuning the RF device based upon the characteristic of the coupled signal.

19. The system of claim 2, wherein said antenna-receiving defines an orifice and said tuning member defines a cavity, said orifice being configured to receive at least a portion of the antenna therethrough, said cavity being configured to receive at least a portion of the antenna therein.

20. The system of claim 4, wherein said antenna-receiving defines an orifice and said tuning member defines a cavity, said orifice being configured to receive at least a portion of the antenna therethrough, said cavity being configured to receive at least a portion of the antenna therein.

21. The system of claim 2, wherein tuning of the resonance in the coupling coefficient of the RF signal is further defined as damping the resonance in the coupling coefficient of the RF signal by said tuning member.

22. The system of claim 4, wherein tuning of the resonance in the coupling coefficient of the RF signal is further defined as damping the resonance in the coupling coefficient of the RF signal by said tuning member.

23. The system of claim 2, further comprising:
   test equipment electrically communicating with said coupler, said test equipment being configured to determine a characteristic of the RF signal.

24. The system of claim 4, further comprising:
   test equipment electrically communicating with said coupler, said test equipment being configured to determine a characteristic of the RF signal.

25. The system of claim 2, further comprising:
   means for supporting said tuning member.

26. The system of claim 4, further comprising:
   means for supporting said tuning member.

27. The system of claim 2, wherein tuning member is formed of ferrite.

28. The system of claim 4, wherein tuning member is formed of ferrite.

29. The system of claim 2, wherein antenna-receiving member is formed of brass.

30. The system of claim 4, wherein antenna-receiving member is formed of brass.

* * * * *